3,186,949
PROCESS FOR PREPARING SOLS
Frederick T. Fitch and Jean G. Smith, Baltimore, Md., assignors to W. R. Grace & Co., New York, N.Y., a corporation of Connecticut
No Drawing. Filed Dec. 5, 1962, Ser. No. 242,354
5 Claims. (Cl. 252—301.1)

This invention relates to the process for preparing actinide oxide sols composed of particles in the 3 to 9 millimicron size range and also to the particles themselves as compositions of matter. In one particular embodiment, it relates to a method of preparing a urania sol wherein zirconia is substituted for part of the urania by removing ions from a mixed uranium-zirconium solution.

Actinide oxide sols are of prime interest in the preparation of ceramic fuel elements. Fuel elements prepared from sols have the advantage of higher mechanical strength and lower sintering temperatures than those prepared from conventional ceramic powders. The sols provide an excellent vehicle for dispersion in the matrix. Since, however, the degree of dispersion attained ultimately depends on the sol particle size, sols of extremely small particle size are preferred.

The incorporation of zirconia into the system assures preparation of a small particle size sol by electrodialysis of a salt solution. Zirconia has a low neutron cross-section and hence does not interfere with the end use of the sol. In fact, the presence of zirconia stabilizes the actinide oxide against oxidation and fission product loss.

We have found that actinide oxide sols which are aqueous dispersions of very reactive particles in the 3 to 9 millimicron size range can be prepared by a process which comprises removing anions from mixtures of solutions of salts of actinide metals and zirconium. For simplicity, our process will be described in terms of a urania-zirconia system. However, the process is equally applicable to the other actinide metals, such as thorium, neptunium, plutonium, americium, curium, etc.

In the first step in the process of the invention, a mixed solution of the appropriate salts is prepared. Broadly, those salts can be used in which the anion is the anion of a strong monobasic acid. For systems containing urania or any oxide which is subject to oxidation and where the lower valence oxide is desired, oxidizing anions, such as nitrate, should be avoided. For most purposes, a mixed chloride solution is preferred. For the urania-zirconia system, a chloride solution was prepared containing uranyl and zirconyl ions. Hydrochloric acid was added to lower the pH. Upon electrodialysis, the uranyl ions were reduced to uranous and the chloride ions removed through the membrane and discharged as chlorine.

The mixed salt solution is prepared in the concentration of about 0.1 to 15 weight percent total oxides. Good results were obtained when the urania to zirconia weight ratio was between 5:1 and 1:1. Then, the solution is subjected to electrodialysis to reduce hexavalent uranium to quadrivalent and remove chloride ion. The system is thereby converted to a hydrous oxide sol.

The equipment used for electrodialysis is described in some detail in our co-pending application, Serial No. 693,511, filed October 31, 1957, now U. S. Patent No. 3,097,175.

In operation, the salt solution is circulated from a stirred reservoir held under a nitrogen atmosphere at a temperature of about 40 to 120° C., preferably at about 80° C., through a water cooler to the electrodialysis cell, and returned to the reservoir. The electrodialysis cell consists of a stirred anode and cathode compartment, each with a platinum gauze electrode separated by an anion-permeable membrane. Gradual anion removal through the membrane results in slow controlled hydrolysis to the oxide at a suitable temperature in the kettle.

Conductivity and pH measurements are made periodically to follow the hydrolysis and sol formation. The electrodialysis is conveniently continued until the material is deionized to the extent that the specific conductance is reduced to $3 \times 10^{-2}$ to $3 \times 10^{-4}$ mhos/cm. and the pH is about 2.5 to 4.5. After the pH and specific conductance have reached suitable levels, the equipment is turned off and the product sol recovered.

The sols of the invention are characterized by being made up of particles of about 3 to 9 millimicrons. These are the sub-unit particles of the sols described in co-pending application, Serial No. 1,159, filed January 8, 1960, now abandoned, which are made up of particles of about 15 to 300 millimicrons in diameter. The sols of the co-pending application are made up by an agglomeration of the small particles. The process of this invention is an important advance over the prior art in that it has developed a method of preventing agglomeration of the particles where a sol composed of very small, reactive particles is desired.

The general character of the particles is determined by use of the electron microscope. The electron micrograph showed that the sol particles were very small, 3 to 9 millimicrons in size. Some of the particles are rod shaped, some are cubes. It was also obvious from the micrographs that urania and zirconia were both present in the same particle. It should be emphasized that under similar electrodialysis conditions, in the absence of zirconia, a urania sol with particles of 15 to 60 millimicrons would have been obtained. Thus, the process of the present invention affords the method of preparing sols in the 3 to 9 millimicron range and a method of preventing agglomeration so that these small particles can be recovered as sols.

Sol pH was measured with a Beckman Model G pH meter and specific conductance with an Industrial Instruments conductivity bridge, Model DC 16B1. The preferred pH range of our sols was established as 3 to 4 and the preferred specific conductance range as $10^{-2}$ to $10^{-3}$ mhos/cm. These preferred sols contain about 5 weight percent solids with a urania to zirconia weight ratio of about 3:1 to about 1:1. If desired, they can be concentrated to about 20 weight percent solids by vacuum evaporation.

The relative viscosity $N_r$ of our sols was determined from the drain time of the sol $t_s$ and the drain time of water $t_w$ in an Ostwald pipet according to the equation:

$$N_r = \frac{t_s}{t_w}$$

The values of $N_r$ were close to 1 showing only a slight increase in viscosity over that of water for the sols of our invention. Furthermore, this relative viscosity figure did not increase when sols were stored for protracted periods, of the order of 3 months or longer. This is an indication of good sol stability.

This invention is further illustrated by the following specific, but non-limiting examples.

*Example I*

A mixed uranyl-zirconyl chloride solution was prepared to contain the equivalent of 2.5 grams of $UO_2$ and 2.5 grams of $ZrO_2$ per 100 ml. solution. The solution was prepared in excess hydrochloric acid. A total of 4 liters of this solution was then electrodialyzed to remove the chloride ion and to thereby convert the system to a hydrous oxide sol. The electrodialysis was carried out in the standard electrodialysis equipment described previously. The solution was circulated through the cathode compartment of a cell divided into two compartments by an anion permeable membrane. Throughout the electrodialysis, the chloride ions migrated through the membrane into the anode compartment which was continuously flushed with deionized water. Uranyl ion was reduced to uranous in the cathode compartment. After leaving the cathode compartment, the solution entered a densification vessel held at 80° C. which was maintained in a nitrogen atmosphere to prevent re-oxidation of the uranium IV. The solution, after leaving the densification vessel, was cooled to below 35° C. before being passed through the electrodialysis cell. The electrodialysis of the solution was continued until specific conductance was reduced to $1.14 \times 10^{-3}$ mhos/cm. with a corresponding pH of 3.8.

Th product was a black sol which displayed no tendency to settle, even on prolonged standing. Its viscosity, relative to that of water, was 1.23. Electron micrographs showed the sol particles to be very small, of the order of 3 to 7 millimicrons. The urania and zirconia were so intimately associated in the particles as to be indistinguishable in the electron micrograph.

*Example II*

A mixed uranyl-zirconyl chloride solution was prepared to contain the equivalent of 7 grams total oxide per 100 ml. with a urania to zirconia weight ratio of 2.3:1. Excess hydrochloric acid was added until the pH was 0.12 and specific conductance was 0.19 mho/cm. Four liters of this solution was transferred to the electrodialysis equipment and converted to a sol exactly as described in Example I.

Electrodialysis was terminated when the pH reached 3.2 and specific conductance reached $1.6 \times 10^{-3}$ mhos/cm. The product sol was black and did not settle, even on prolonged standing. Electron micrographs showed it to consist primarily of well-dispersed, 3 to 7 millimicron particles with a few incipient aggregates of the order of 15 millimicrons. The urania and zirconia were so intimately dispersed that the particles appeared to be of homogeneous composition.

Obviously many modifications and variations of the invention, as herein above set forth, may be made without departing from the essence and scope thereof, and only such limitations should be applied as indicated in the appended claims.

What is claimed:

1. A process for preparing a urania-zirconia aquasol comprising an aqueous dispersion of particles in the 3 to 9 millimicron size range which comprises electrodialyzing a mixed solution of uranyl chloride and zirconyl chloride in a urania to zirconia weight ratio of about 3:1, heating intermittently to a temperature of about 40 to 120° C. under a protective atmosphere of nitrogen and recovering the product sol.

2. A process for preparing an aqueous sol with a urania to zirconia weight ratio of about 3:1 and composed of particles in the 3 to 9 millimicron size range which comprises electrodialyzing a mixed solution of uranyl and zirconyl chloride wherein the urania to zirconia weight ratio is about 3 to 1 with intermittent heating at a temperature of about 80° C. and recovering the product sol.

3. As compositions of matter, colloidal particles consisting of oxides of urania intimately associated with zirconia, said particles having a urania to zirconia weight ratio of 5:1 to 1:1 and a diameter of about 3 to 9 millimicrons.

4. As compositions of matter, sols of urania-zirconia particles in the size range of about 3 to 9 millimicrons wherein the component oxides are in solid solution phase with a urania to zirconia weight ratio of 5:1 to 1:1, said sols containing up to about 20 percent solids.

5. A process for preparing an aquasol of urania and zirconia by electrodialysis technique, the improvement comprising preventing the agglomeration of the particles in the size range of 3 to 9 millimicrons to larger particles by preparing a mixed solution uranyl and zirconyl chlorides in which the total metal content, expressed as oxides, is about 0.1 to 15 weight percent and the urania to zirconia ratio is between 5 to 1 and 1 to 1, subjecting the said solution to electrodialysis at a temperature of about 80° C. in the presence of an inert atmosphere and recovering a product sol having particles in the 3 to 9 millimicrons size range.

References Cited by the Examiner

UNITED STATES PATENTS

| | | | |
|---|---|---|---|
| 2,984,628 | 5/61 | Alexander et al. | 252—313 |
| 3,019,103 | 6/62 | Alexander et al. | 75—206 |
| 3,091,592 | 5/63 | Fitch et al. | 252—301.1 |

CARL D. QUARFORTH, *Primary Examiner.*